(12) United States Patent
Lamoncha

(10) Patent No.: US 11,797,937 B2
(45) Date of Patent: Oct. 24, 2023

(54) SYSTEM AND METHOD FOR HIRING AND AUTHENTICATING PERSONS TO PERFORM SERVICES ON A TEMPORARY BASIS

(71) Applicant: Mark Lamoncha, Columbiana, OH (US)

(72) Inventor: Mark Lamoncha, Columbiana, OH (US)

( * ) Notice: Subject to any disclaimer, the term of this patent is extended or adjusted under 35 U.S.C. 154(b) by 667 days.

(21) Appl. No.: 16/286,142

(22) Filed: Feb. 26, 2019

(65) Prior Publication Data

US 2019/0266571 A1 Aug. 29, 2019

Related U.S. Application Data

(60) Provisional application No. 62/635,062, filed on Feb. 26, 2018.

(51) Int. Cl.
*G06Q 10/1053* (2023.01)
*G06Q 10/0631* (2023.01)

(52) U.S. Cl.
CPC . *G06Q 10/1053* (2013.01); *G06Q 10/063112* (2013.01)

(58) Field of Classification Search
CPC ....... G06Q 10/1053; G06Q 10/063112; G06Q 30/0639; G06Q 30/0633; G06Q 50/10; G06Q 30/0283; G06Q 10/02; G06Q 20/102; H04L 67/306; Y10S 707/945
See application file for complete search history.

(56) References Cited

U.S. PATENT DOCUMENTS

| | | |
|---|---|---|
| 4,398,321 A | 8/1983 | Sunesson |
| 7,272,575 B2 | 9/2007 | Vega |
| 7,424,438 B2 | 9/2008 | Vianello |
| 8,666,842 B1 | 3/2014 | Herbette et al. |
| 9,369,195 B2 | 7/2016 | Beguelin |
| 9,384,271 B1 | 7/2016 | Goldin et al. |
| 9,575,837 B2 | 2/2017 | Holden et al. |
| 9,615,208 B2 | 4/2017 | Fjeldsoe-Nielsen |
| 9,679,489 B2 | 6/2017 | Lambert et al. |
| 9,769,616 B1 | 9/2017 | Pao et al. |
| 9,797,291 B2 | 10/2017 | Eadie et al. |

(Continued)

OTHER PUBLICATIONS

AIA Document A201™—2017 "General Conditions of the Contract for Construction" 2017, herein referred to as "AIA"; available at: https://content.aia.org/sites/default/files/2017-04/A201_2017%20sample%20%28002%29.pdf (Year: 2017).*

(Continued)

*Primary Examiner* — Brendan S O'Shea
(74) *Attorney, Agent, or Firm* — Standley Law Group LLP; Jeffrey S. Standley; Adam J. Smith

(57) ABSTRACT

A server hosts an application for hiring persons to perform services on a temporary basis. At least one hiring user electronic device and at least one worker user electronic device are placed in communication with the server. The application gathers information to register new worker users and hiring users as well as create new job entries. The application presents a list of matching jobs to a worker user. Once a job is selected, the worker performs the services. The hiring user confirms that the work was performed and the worker user's compensation is calculated and disbursed.

18 Claims, 16 Drawing Sheets

(56) References Cited

U.S. PATENT DOCUMENTS

| | | | |
|---|---|---|---|
| 9,888,087 B2 | 2/2018 | Barreto | |
| 9,894,484 B1 | 2/2018 | Pao et al. | |
| 9,953,538 B1 | 4/2018 | Matthiesen et al. | |
| 9,965,960 B1 | 5/2018 | McDavitt-Van Fleet | |
| 9,976,863 B2 | 5/2018 | Dryjanski et al. | |
| 9,978,282 B2 | 5/2018 | Lambert et al. | |
| 10,009,306 B2 | 6/2018 | Garg et al. | |
| 10,082,562 B1 | 9/2018 | Abari et al. | |
| 10,084,845 B2 | 9/2018 | Aggarwal et al. | |
| D831,053 S | 10/2018 | Guo et al. | |
| 10,091,618 B1 | 10/2018 | Pao et al. | |
| 10,093,252 B2 | 10/2018 | Zych | |
| 10,126,138 B1 | 11/2018 | Farmer et al. | |
| 10,127,795 B1 | 11/2018 | Hwang et al. | |
| 10,152,892 B2 | 12/2018 | Matthiesen et al. | |
| 10,158,528 B2 | 12/2018 | Cobb | |
| 10,175,340 B1 | 1/2019 | Abari et al. | |
| 10,192,387 B2 | 1/2019 | Brinig et al. | |
| 10,198,700 B2 | 2/2019 | Farrelly et al. | |
| 10,440,014 B1* | 10/2019 | Hoyer | G06F 21/31 |
| 10,963,848 B1* | 3/2021 | Anderson | G06Q 30/0283 |
| 2006/0195365 A1* | 8/2006 | Karabetsos | G06Q 10/109 |
| | | | 705/7.19 |
| 2007/0124196 A1 | 5/2007 | Brief et al. | |
| 2007/0156429 A1 | 7/2007 | Godar | |
| 2007/0192229 A1 | 8/2007 | Rowan | |
| 2008/0004980 A1 | 1/2008 | Hernandez | |
| 2008/0015883 A1 | 1/2008 | Hermann | |
| 2013/0339168 A1 | 12/2013 | White et al. | |
| 2014/0122355 A1 | 5/2014 | Hardtke et al. | |
| 2014/0304183 A1* | 10/2014 | Zabar | G06Q 50/265 |
| | | | 705/321 |
| 2015/0262430 A1 | 9/2015 | Farrelly et al. | |
| 2015/0278892 A1 | 10/2015 | Roy | |
| 2015/0281387 A1 | 10/2015 | Barreto | |
| 2015/0302414 A1* | 10/2015 | Cox | G06Q 30/0641 |
| | | | 705/7.19 |
| 2016/0027306 A1 | 1/2016 | Lambert et al. | |
| 2016/0048831 A1 | 2/2016 | Ongchin | |
| 2016/0078394 A1 | 3/2016 | Fuldner | |
| 2016/0135006 A1 | 5/2016 | Fjeldsoe-Nielsen | |
| 2016/0224426 A1 | 8/2016 | Holden et al. | |
| 2016/0307289 A1 | 10/2016 | Choksi et al. | |
| 2016/0328471 A1 | 11/2016 | Goldin et al. | |
| 2016/0335694 A1* | 11/2016 | Catino | G06Q 30/0625 |
| 2016/0337294 A1 | 11/2016 | Garg et al. | |
| 2017/0034085 A1 | 2/2017 | Bijor et al. | |
| 2017/0078380 A1 | 3/2017 | Aggarwal et al. | |
| 2017/0104629 A1 | 4/2017 | Cobb | |
| 2017/0109661 A1* | 4/2017 | Bergman | G06Q 30/0282 |
| 2017/0116065 A1 | 4/2017 | Holden et al. | |
| 2017/0193404 A1 | 7/2017 | Yoo et al. | |
| 2017/0193405 A1 | 7/2017 | Lambert et al. | |
| 2017/0193523 A1 | 7/2017 | Goldin et al. | |
| 2017/0193625 A1 | 7/2017 | Fan et al. | |
| 2017/0195476 A1 | 7/2017 | Fjeldsoe-Nielsen | |
| 2017/0243492 A1 | 8/2017 | Lambert et al. | |
| 2017/0256168 A1 | 9/2017 | Lambert et al. | |
| 2017/0262659 A1 | 9/2017 | Kuris | |
| 2017/0270456 A1* | 9/2017 | Branagh | G06Q 10/1053 |
| 2017/0282821 A1 | 10/2017 | Zych | |
| 2017/0284820 A1 | 10/2017 | Dryjanski et al. | |
| 2018/0091604 A1 | 3/2018 | Yamashita et al. | |
| 2018/0092057 A1 | 3/2018 | Yamashita et al. | |
| 2018/0096445 A1 | 4/2018 | Eyler et al. | |
| 2018/0101925 A1 | 4/2018 | Brinig et al. | |
| 2018/0136000 A1 | 5/2018 | Rasmusson, Jr. et al. | |
| 2018/0136656 A1 | 5/2018 | Rasmusson, Jr. et al. | |
| 2018/0137373 A1 | 5/2018 | Rasmusson, Jr. et al. | |
| 2018/0159946 A1 | 6/2018 | Barreto | |
| 2018/0174250 A1* | 6/2018 | Faulkner | G06F 3/04842 |
| 2018/0188731 A1 | 7/2018 | Matthiesen et al. | |
| 2018/0189713 A1 | 7/2018 | Matthiesen et al. | |
| 2018/0189917 A1 | 7/2018 | Shen et al. | |
| 2018/0191863 A1 | 7/2018 | Matthiesen et al. | |
| 2018/0227258 A1 | 8/2018 | Garg et al. | |
| 2018/0238695 A1 | 8/2018 | Dryjanksi et al. | |
| 2018/0240055 A1* | 8/2018 | Theus | G06Q 10/06311 |
| 2018/0240344 A1 | 8/2018 | Matthiesen et al. | |
| 2018/0259351 A1 | 9/2018 | Broyles et al. | |
| 2018/0268709 A1 | 9/2018 | Lambert et al. | |
| 2018/0288568 A1 | 10/2018 | Pao et al. | |
| 2018/0300660 A1 | 10/2018 | Coan et al. | |
| 2018/0308191 A1 | 10/2018 | Matthiesen et al. | |
| 2018/0315146 A1 | 11/2018 | Matthiesen et al. | |
| 2018/0315148 A1 | 11/2018 | Luo et al. | |
| 2018/0328747 A1 | 11/2018 | Farmer et al. | |
| 2018/0328748 A1 | 11/2018 | Chachra et al. | |
| 2018/0330308 A1* | 11/2018 | Ahmed | G06Q 10/06312 |
| 2019/0011931 A1 | 1/2019 | Selvam et al. | |
| 2019/0017839 A1 | 1/2019 | Eyler et al. | |
| 2019/0019329 A1 | 1/2019 | Eyler et al. | |
| 2019/0020708 A1 | 1/2019 | Aggarwal et al. | |
| 2019/0031097 A1 | 1/2019 | O'Herlihy et al. | |
| 2019/0037355 A1 | 1/2019 | Pao et al. | |
| 2019/0043365 A1 | 2/2019 | McDavitt-Van Fleet | |
| 2019/0044805 A1 | 2/2019 | Cobb | |
| 2019/0051174 A1 | 2/2019 | Haque et al. | |
| 2019/0279279 A1* | 9/2019 | Tomar | G06Q 30/06 |

OTHER PUBLICATIONS

"How TaskRabbit Works: Insights into Business & Revenue Model" Medium.com, Aug. 20, 2015; available at: https://medium.com/uber-for-x/how-taskrabbit-works-insights-into-business-revenue-model-640c8e4895ef (Year: 2015).*

Airtasker, https://www.aidasker.com, site accessed Nov. 27, 2017.

care.com, Care Seekers, https://www.care.com, site accessed Nov. 27, 2017.

Juggle, http://whyjuggle.com, site accessed Nov. 27, 2017.

Taskrabbit, https://www.taskrabbit.com, site accessed Nov. 27, 2017.

Taskrabbit, How to Use Task Rabbit to Outsource Work in Your Neighborhood, https://www.youtube.com/watch?v=bCZDTWH6wcQ, Dec. 13, 2013.

* cited by examiner

What services do you need? — 202

- ☐ Plumbing clog
- ☐ Plumbing leak
- ☐ Bookkeeper
- ☐ Cook – residential
- ☐ Cook – commercial
- ☐ Mow yard
- ☐ Leaf raking
- ☐ Drywall installation
- ☐ Seamstress/tailor
- ☐ Party planner
- ☐ Caterer
- ☐ Auto mechanic
- ☐ Photographer
- ☐ Handyman
- ☐ Carpenter
- ...

We found these tools you may need, what do you have or need?

- ☐ Screwdriver
  - ☐ Please bring
  - ☐ Will provide
- ☐ Wrench
  - ☐ Please bring
  - ☐ Will provide
- ☐ Socket set
  - ☐ Please bring
  - ☐ Will provide
- ☐ Lawn mower
  - ☐ Please bring
  - ☐ Will provide
- ☐ Leaf rake
  - ☐ Please bring
  - ☐ Will provide
- ☐ Bore snake
  - ☐ Please bring
  - ☐ Will provide
- ☐ Cooking equipment
  - ☐ Please bring
  - ☐ Will provide
- ☐ Building supplies
  - ☐ Please bring
  - ☐ Will provide
- ☐ Table Saw
  - ☐ Please bring
  - ☐ Will provide
- ☐ Chain Saw
  - ☐ Please bring
  - ☐ Will provide
- ...

SYSTEM AND METHOD FOR HIRING AND AUTHENTICATING PERSONS TO PERFORM SERVICES ON A TEMPORARY BASIS

CROSS-REFERENCE TO RELATED APPLICATION

This application claims the benefit of U.S. Provisional Application Ser. No. 62/635,062 filed Feb. 26, 2018, the disclosures of which are hereby incorporated by reference as if fully restated herein.

TECHNICAL FIELD

Exemplary embodiments of the present invention relate generally to a system and method for hiring individuals to perform services on a temporary basis.

BACKGROUND AND SUMMARY OF THE INVENTION

Companies sometimes require assistance above and beyond the capacity of their current workforce. Individuals sometimes require assistance for tasks they do not have the resources, skills, or desire to complete. Companies and individuals may either require additional laborers or they may require a person having specialized knowledge or tools that are not available among those in their current workforce or resources. The assistance needed may involve manual or skilled labor. Often times, the company or individual looking to hire services needs a person or persons who can help for a period of time (e.g., a number of hours) or for a particular project (e.g., a number of widgets made), but does not necessarily have the need or desire to bring on said person or persons on a permanent, semi-permanent, and/or full-time basis.

Similarly, individuals or companies looking to be hired often face the problem of having additional time or interest in further work that they are not currently employed for, or that is not fulfilled by their current employment. Such people may have un- or under-utilized time, skills, tools, or other resources that could otherwise be translated into dollars as well as additional training and experience. However, such individuals often do not have the time or interest in working a first, second, third, etc. such job on a permanent, semi-permanent, and/or full-time basis. Instead, such persons are generally available to help for a period of time (e.g., a number of hours, a number of days, etc.) or for a particular project (e.g., fixing something, making a number of widgets, etc.).

Additionally, the process of seeking and becoming employed as temporary labor is burdensome. Often times, this process is so burdensome that it renders the individuals or companies looking to hire and looking to be hired unwilling to do so, despite having a need for it—this is especially true of particularly small projects like unclogging a sink, raking leaves, or re-wiring a lamp, for example without limitation. The traditional route of applying to a temporary placement agency, matching candidates to positions, performing the hiring, and onboarding such person or persons is particularly time consuming and costly—both for the company or individual doing the hiring and for the person or persons being hired. Furthermore, there are significant delays in this process, when individually or companies often times need the additional help immediately.

Therefore, what is needed is a system and method that facilitates the hiring of persons to perform services on a temporary basis. These disclosures provide a system and method that facilitates the hiring of persons to perform services on a temporary basis.

In exemplary embodiments, a software application ("app") may be installed and executed on a personal electronic device, where the app facilitates such hiring. The app may be utilized by worker users who create profiles that provide information about themselves or their company which are available for hiring. Such information may include the type of work they are interested in, photos, resume information, payment information, skills, tools, and the like. Hiring users may also create profiles with information about themselves or their company as well as payment information. Hiring user may create job entries which include the services needed and geographic information.

The app may be configured to present the hiring user with a list of possible matching worker users. The worker users available for immediate hire may be indicated on a list and/or on a map of the area with a symbol. In other exemplary embodiments, the app may instead by configured to present the worker user with a list of possible matching jobs. The jobs available for immediate hire may be indicated on a list and/or on a map of the area with a symbol. The app may facilitate further negotiations between worker users and the hiring user, if desired.

Once an agreement is reached, the worker user shows up to work. In exemplary embodiments, the worker user may present a validation device to the hiring user to verify who the worker user is. Such validation may be performed at the app. The validation device may be provided to the worker user upon registration of the worker user at the app. After completing the work and confirming that the same has been done, the worker compensation is calculated and disbursed by way of the app. The app may permit the worker user to provide feedback regarding the hiring user. Similarly, the app may permit the hiring user to provide feedback regarding the worker user. The app may further track and provide periodic (e.g., monthly, quarterly, end of year, etc.) summary information to the worker user as well as the hiring user for business record keeping as well as tax purposes. In exemplary embodiment, the validation device, along with any certification and training credentials, may be stored on an electronic fob that attaches to the worker user's device. Attachment of the fob may activate the worker user's availability status.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3 is an exemplary user interface for a new job entry;

FIG. 6 is another exemplary user interface for the new job entry;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
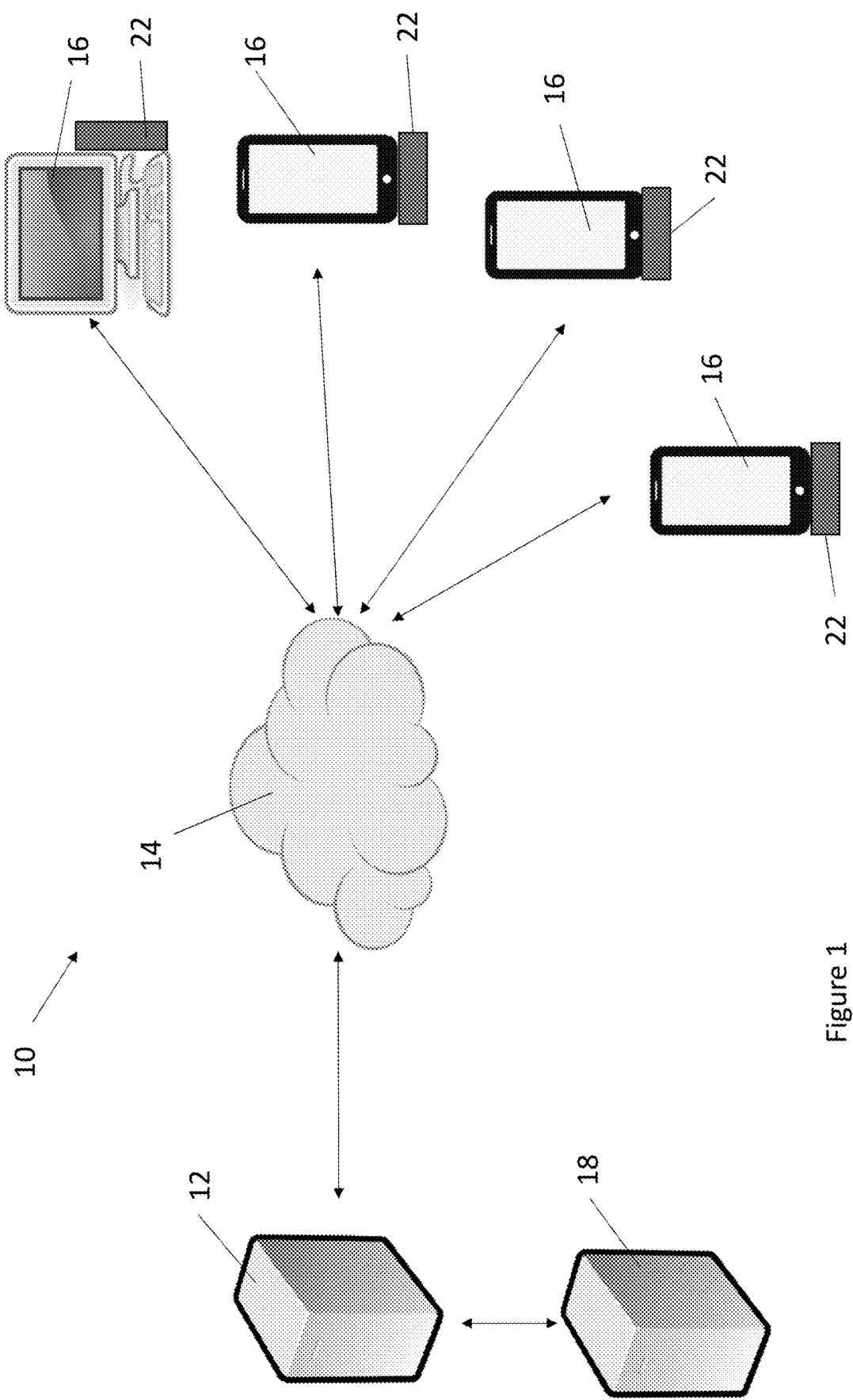
FIG. 1 is a plan view of an exemplary system in accordance with the present disclosures.

FIG. 1 is a plan view of an exemplary system 10. The system 10 may comprise a server 12 in communication with one or more user devices 16. The server 12 may be in communication with the user devices 16 by way of a network 14. The server 12 may comprise one or more electronic storage devices, processors, network connectivity devices, and the like. In exemplary embodiments, the network 14 may be the world wide web. However, it is contemplated that the network 14 may be any internet, intranet, cellular network, some combination thereof, or the like. One or more user devices 16 may be in communication with the server 12 by way of the network 14. The user devices 16 may be, without limitation, personal computers, desktop computers, laptops, tablets, smartphone, smart watches, cellular telephones, PDAs, or the like. The user devices 16 may comprise one or more electronic storage devices, processors, network connectivity devices, and the like.

A first subset of the user devices 16 may be operated by, or otherwise associated with, individuals or entities seeking to be hired (hereinafter also "worker users"). A second subset of the user devices 16 may be operated by, or otherwise associated with, entities or individuals seeking to hire others (hereinafter also "hiring users"). The communications described herein may be accomplished by a wired or wireless connection, some combination thereof, or the like. Executable software instructions may be provided, which may be stored on one or more of the electronic storage devices and may be executed by one or more of the processors. Such executable software instructions, when executed, may configure the one or more processors to provide the features and/or perform the operations described herein.

In exemplary embodiments, the server 12 may be configured to host an app that facilitates the hiring of persons or entities. Alternatively, or in addition, the server 12 may be configured to provide access to the app or information utilized when running the app. The user devices 16 may each comprise corresponding apps which may be accessed or installed thereon. In exemplary embodiments, input received on one or more of the user device 16 may be translated and communicated to the server 12 and stored thereon. The data stored on the server 12 may then be accessible by the other user devices 16 by way of the app. In other exemplary embodiments, it is contemplated that the server 12 may alternatively, or additionally, host a website or the like to facilitate such data storage and communication. In such embodiments, the user devices 16 may each similarly access the data stored on the server 12 by way of an internet browser, network connectivity device, or the like. In still other exemplary embodiments, the app and corresponding information may be stored on the various user devices 16 and sent to the other user devices 16 as required. It is contemplated that some combination of the above may be utilized.

The server 12 may be in electronic communication with a payment processing module 18. The payment processing module 18 may be a credit or debit card processing module, a bank transfer module, or the like. The payment processing module 18 may be configured to facilitate credit or debit transitions, bank account transfers, direct deposits, and the like.

In exemplary embodiments, the system 10 may further comprise electronic fobs 22. Each of the electronic fobs 22 may be configure to connected to one of the user devices 16. The electronic fobs 22 may be configured to store electronic information regarding the user associated with the given user device 16. Such electronic information may include, for example without limitation, training, experience, certifications, payment information, verification information, other information used by the app, and the like. Connection of the fob 22 to the user device 16 may cause the associated worker user to be indicated as available for hiring on the app. The user of a fob 22 is not required. In other exemplary embodiments, such information may be stored at the user device 16, the server 12, some combination thereof, or the like.

Figure 2:
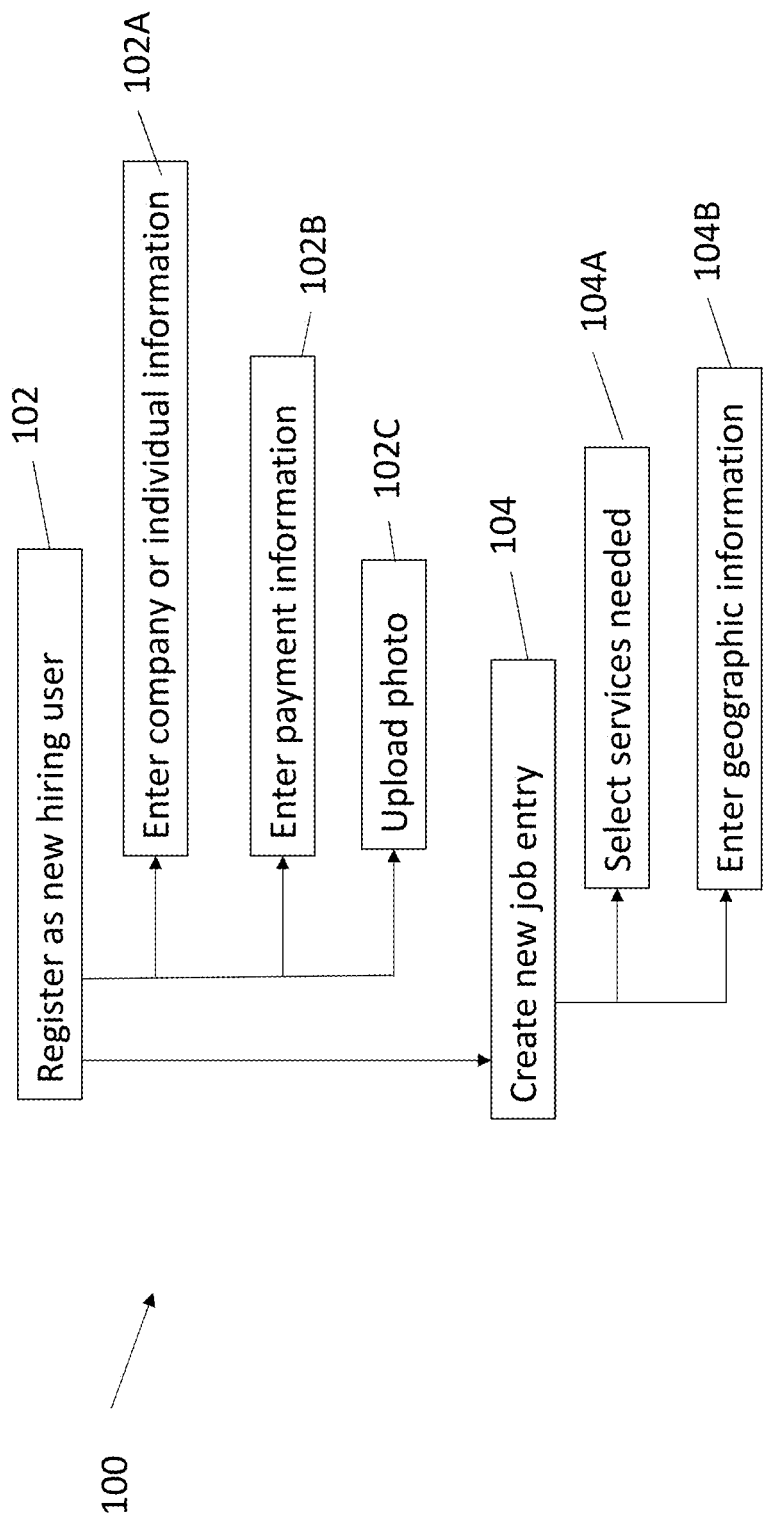
FIG. 2 is a flow chart of exemplary logic for registering a new hiring user and creating a new job.

FIG. 2 is a flow chart of exemplary hiring user side logic 100 for the app. In exemplary embodiments, the hiring side logic 100 may be utilized with the system illustrated and described with respect to FIG. 1. More specifically, in exemplary embodiments, the hiring side logic 100 may represent steps, prompts, pages, interactions, or the like that are taken in conjunction with the operation of the app or website as utilized by an entity(s) or person(s) seeking to hire individuals. It is notable that the order of the steps provided herein is merely exemplary, any order of steps, including the repetition of one or more steps, is contemplated unless specifically stated otherwise.

In step 102, a new hiring user may register with the app or website. The registration process may prompt the user to input the following information, without limitation, hiring company or individual information (step 102A), payment information (step 102B), and a photo(s) (step 102C). The payment information, step 102B, may include the bank account information, credit card information, debit card information, or the like from which payment funds should be withdrawn, debited, credited, or the like. Such payment information processing may be performed at the payment processing module 18.

In exemplary embodiments, the hiring user may choose to import some or all of the hiring company or individual information at step 102A from another source such as, but not limited to, Facebook®, LinkedIn®, or the like. The categories of information listed with respect to steps 102A and 102B are merely exemplary, any number or types of categories of information requested is contemplated. Additionally, payment information 102B may be imported from a photo of a check, credit card, debit card, or the like. Furthermore, such payment information 102B may be imported from the hiring user's online banking portal.

If the hiring user is already registered, the user may instead log-in to their existing profile. The user may be presented with an option to update their profile as desired.

At step 104, the user may create one or more new job entries. The new job entry 104 may include, but is not limited to, the services needed (step 104A) and the geographic location the services are needed at (step 104B).

FIG. 3 is an exemplary user interface for a new job entry which may be encountered by a hiring user on their device 16 at step 104A of FIG. 2, though such is not required. The user interface may request service desired information 200. The hiring user may first encounter a prompt 202 asking the hiring user what services they are in need of. Any number of predefined service tasks 204 may be presented in a list with the ability to select one or more such services. Such selection may be made by touching, swiping, tapping, clicking, radio button, check box, or the like. In other exemplary embodiments, the user may be permitted to begin typing a description of the service required and a form may be prepopulated with suggestions of the predefined service tasks 204 for the hiring user to select. The predefined service tasks 204 shown in FIG. 3 are merely exemplary and are not intended to be limiting.

Figure 4:
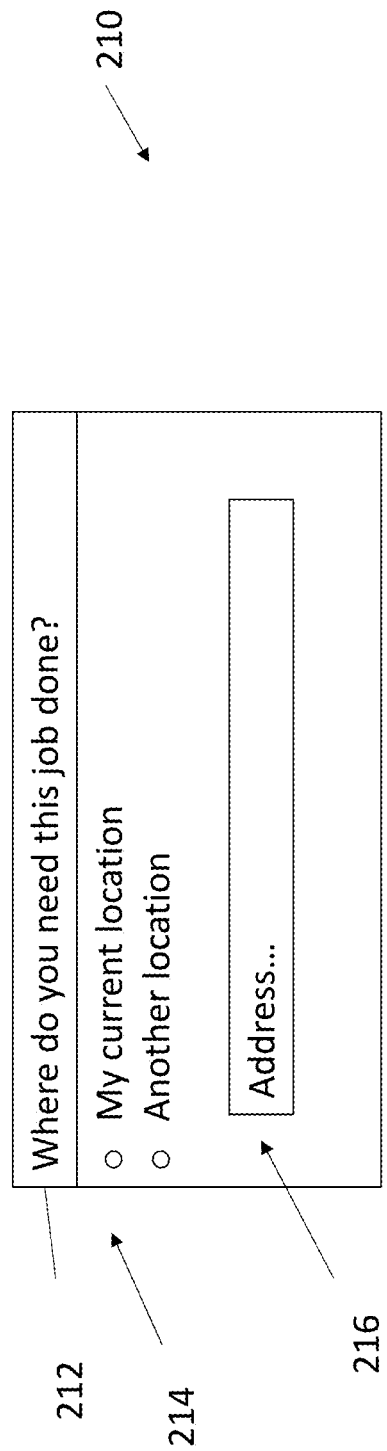
FIG. 4 is another exemplary user interface for the new job entry.

FIG. 4 is another exemplary user interface for the new job entry which may be encountered by the hiring user at step 104B of FIG. 2 following the selection of the desired service as shown and described with respect to FIG. 3, though such is not required. The user interface may request geographic job site information 210. The hiring user may encounter a prompt 212 asking the hiring user where the service needs to be performed. Prompts to determine and utilize the hiring user's current location 214 or another location 216 may be provided. If the hiring user selects their current location 214, the app may access the hiring user device's 16 location information to determine the location for the new job entry. If the hiring user selects another location 216, the hiring user may enter the address or other location information for the new job entry.

Figure 5:
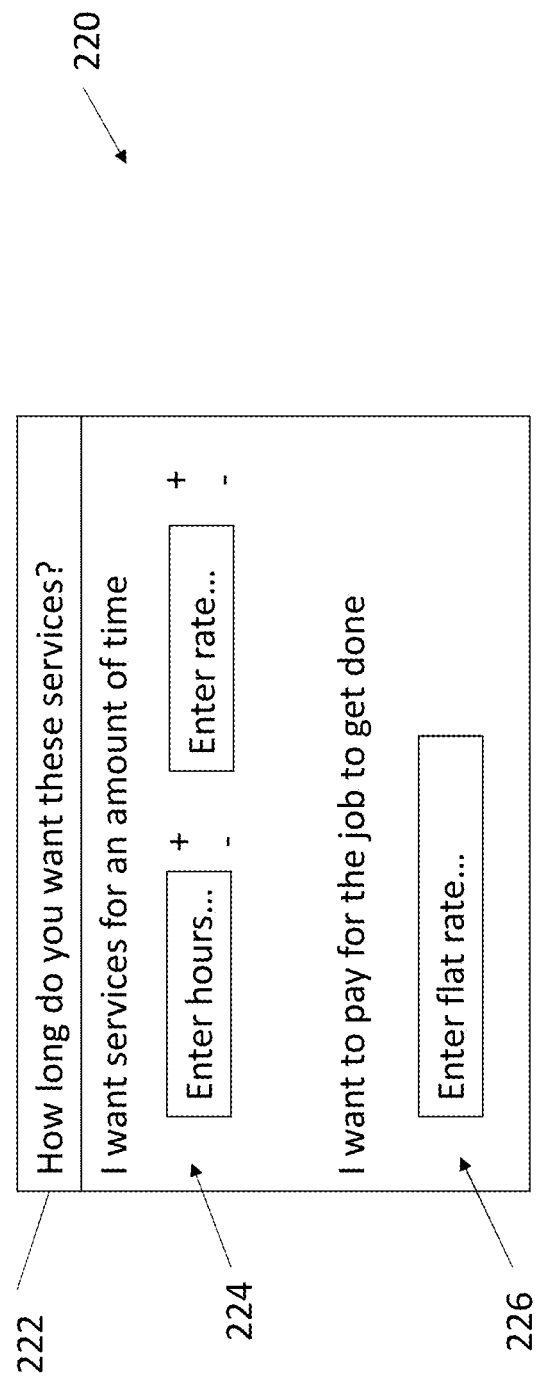
FIG. 5 is another exemplary user interface for the new job entry.

FIG. 5 is another exemplary user interface for the new job entry which may be encountered by the hiring user at step 104A of FIG. 2 following the selection of the desired service location as shown and described with respect to FIG. 3, though such is not required. The user interface may request compensation information 220. The hiring user may encounter a prompt 222 asking the hiring user how long they would like the services for and what they are willing to pay hourly. The hiring user may be permitted to choose between a set amount of time 224 or a flat rate to complete the job 226. In exemplary embodiments, the amount of time 224 may be entered in hours, though such it not required. A dollar amount would preferably be entered under the flat rate 226 prompt. The compensation options listed in FIG. 5 are merely exemplary and are not intended to be limiting.

FIG. 6 is another exemplary user interface for the new job entry which may be encountered by the hiring user at step 104A of FIG. 2 following the selection of the desired service time and rate as shown and described with respect to FIG. 5, though such is not required. The user interface may request tool needed and provided information 230. The hiring user may encounter a prompt 232 asking the hiring user what tools they will need 234. In exemplary embodiments, the app may be configured to provide a predetermined list of tools 234 likely required based for the selected desired service. For each selected tool from the predefined list 234, a prompt 236 may be provided to select whether this is a tool the hiring user will provide or that needs to be brought by the worker user. The predefined tools 234 shown in FIG. 6 are merely exemplary and are not intended to be limiting.

Figure 7:
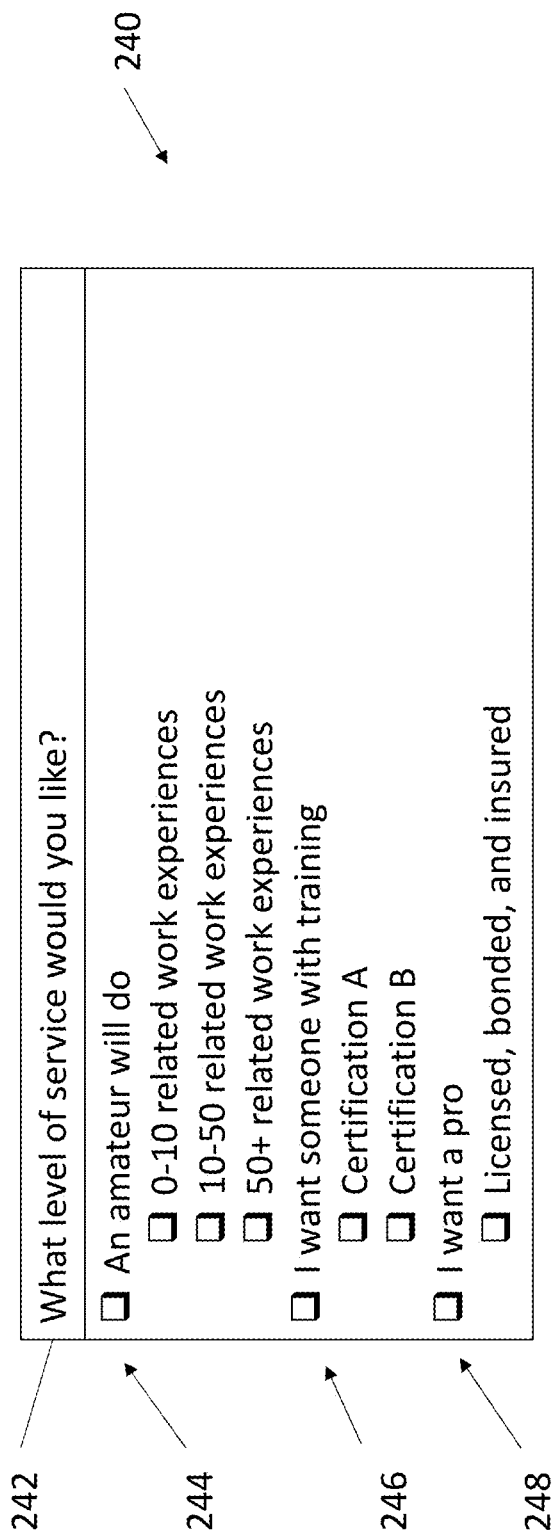
FIG. 7 is another exemplary user interface for the new job entry.

FIG. 7 is another exemplary user interface for the new job entry which may be encountered by the hiring user at step 104A of FIG. 2 following the selection of the desired tools with respect to FIG. 6, though such is not required. The user interface may comprise level of service information 240. The hiring user may encounter a prompt 242 asking the hiring user what level of service they desire. Prompts to select an amateur 244, sometime with training 246, or someone who is a professional 248 may be provided. If the amateur option 244 is selected, a sub-prompt with a range of possible experience levels may be provided. If the trained option 246 is selected, a sub-prompt with a range of possible certifications may be provided. If the professional option 248 is selected, a sub-prompt with a range of possible licensing, bonded, and insured options may be presented.

Additionally, or alternatively, the app may be configured to only permit the registration of worker users at, for example without limitation, the worker user side logic 300 if the worker user is able to show proof of various experience levels, training certifications, licenses, bonds, insurance, and the like. Such proof of experience levels, training certifications, licenses, bonds, insurance, and the like may be stored, in exemplary embodiment, at the fob 22. Alternatively, or additionally, such experience levels, training certifications, licenses, bonds, insurance, and the like may be stored at the app. The experience level may be tracked by the app and automatically updated according to the number of the same or related types of jobs the worker user has completed using the app. This may advantageously permit for worker user experience to be accurately tracked. This may also permit ease of updating and accurate experience information to be presented.

The training certifications may likewise be tracked by the app, through the verified completion of one or more training modules provided by or through the app. Alternatively, or in addition, such training certifications may be provided by the hiring user or a third party and verified by the hiring user for addition to the respective worker user's profile.

The order of the user interfaces presented in FIG. 3 through FIG. 7 are merely exemplary and are not intended to be limiting. It is contemplated that any number of user interfaces may be presented on any number of screens in any format and in any order.

Figure 8:
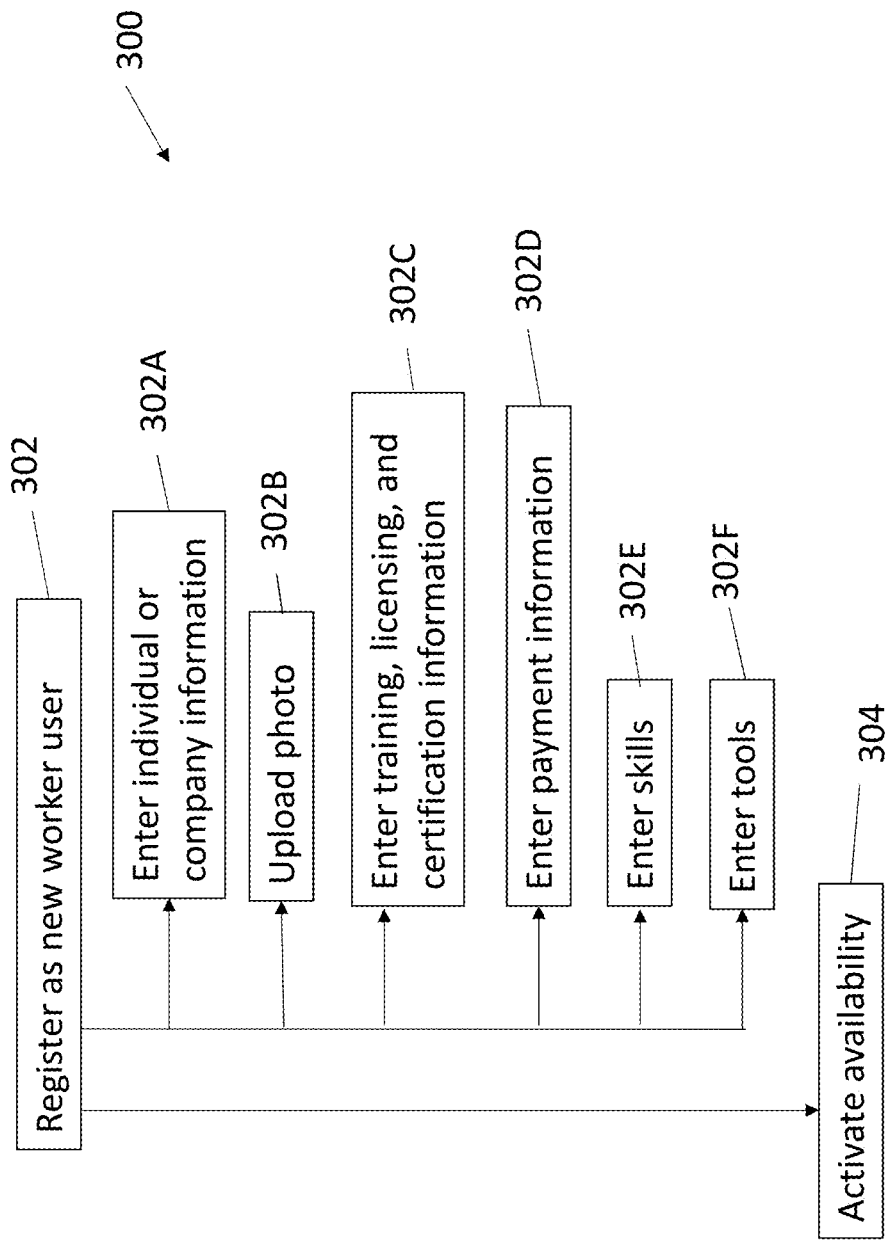
FIG. 8 is a flow chart of exemplary logic for registering a new worker user.

FIG. 8 is a flow chart of exemplary worker user side logic 300 for use with the system 10. In exemplary embodiments, the worker side logic 300 may be utilized with the app or website described with respect to FIG. 1. More specifically, in exemplary embodiments, the worker side logic 300 may represent steps, prompts, pages, interactions, or the like that are taken in conjunction with the operation of the app or website as utilized by a person or persons seeking to be hired. It is notable that the order of the steps provided herein is merely exemplary, any order of steps, including the repetition of one or more steps, is contemplated unless specifically stated otherwise.

In step 302, a new worker user may register with the app or website. The registration process may prompt the user to input the following information, without limitation, individual or company information (302A), a photo(s) (step 302B), training, licensing, and certification information (step 302C), payment information (step 302D), skills (step 302E), and tools (step 302F). In exemplary embodiments, the user may choose to import some or all of the information described in steps 102a-102e from another source such as, but not limited to, Facebook®, LinkedIn®, or the like.

The skills selected at step 302E may correspond with the predefined list of services 204, though such is not required. The training, licensing, and certification information at step 302C may correspond to the service levels 240. Similarly, the tools selected at step 302F may correspond with the predefined list of tools 234. Any or all of the aforementioned information, along with any other information, may be stored at the fob 22, on the app, or the like.

Payment information 302D may be imported from a photo of a check, credit card, debit card, or by linking to the worker user's online banking portal. Alternatively, if the user is already registered, the user may instead log in to their existing profile. The user may be presented with an option to update their profile as desired.

At step 304, the worker user may indicate their availability status. In exemplary embodiments, without limitation, the worker user is automatically indicated as available upon connection of the fob 22.

Figure 9:
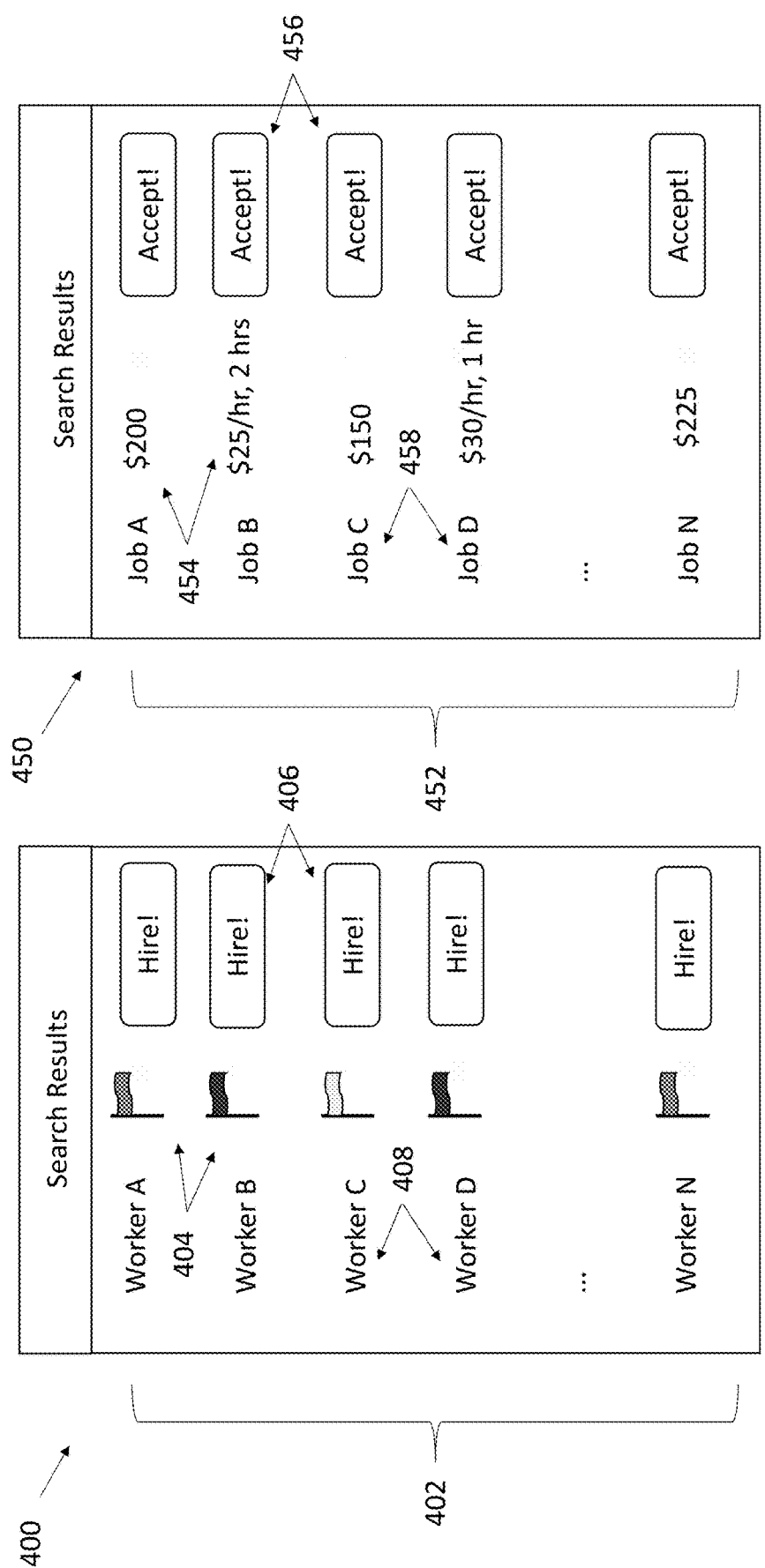
FIG. 9A is an exemplary results list of worker users.
FIG. 9B is an exemplary results list of job entries.

In exemplary embodiments, a number of worker users, as generally indicated at item 402, with skills, tools, and training, licensing, and certification information matching a given hiring worker's job entry may be returned to the hiring user following completion of the new job entry. Such number of worker user entries 402 may be returned in the form of a list 400 as shown in FIG. 9A. Each returned worker user entry 402 may comprise a photo, name, or brief description of the worker use 408 as well as a signal 404 located next to the returned worker user indicating the respective worker user's availability. Such a signal may include, for example without limitation, a green flag for immediate availability, a red flag for not available, and a yellow flag for availability within a certain time period (e.g., available soon). Any kind of signal is contemplated. The worker user entries 402 may be ranked by geographic proximity to the hiring user's job site, though such is not required. A selection tool 406 may be located next to each worker user entry 402 such that a given hiring user may select a given worker user.

Alternatively, or in addition, a number of jobs, as generally indicated at item 452, may be returned with service criteria, tools, and training, licensing, and certification information matching a given worker user's profile information. Such number of job entries 452 may be returned in the form of a list 450 as shown in FIG. 9B. Each returned job entry 452 may comprise a title or brief description 458 as well as a compensation rate 454 for the job. The compensation rate 454 may be shown in a time rate and the amount of time estimated for the job and/or as a flat rate for completion. An accept tool 456 may be located next to each job entry 454 such that a given worker user may accept a given job offer.

Figure 10:
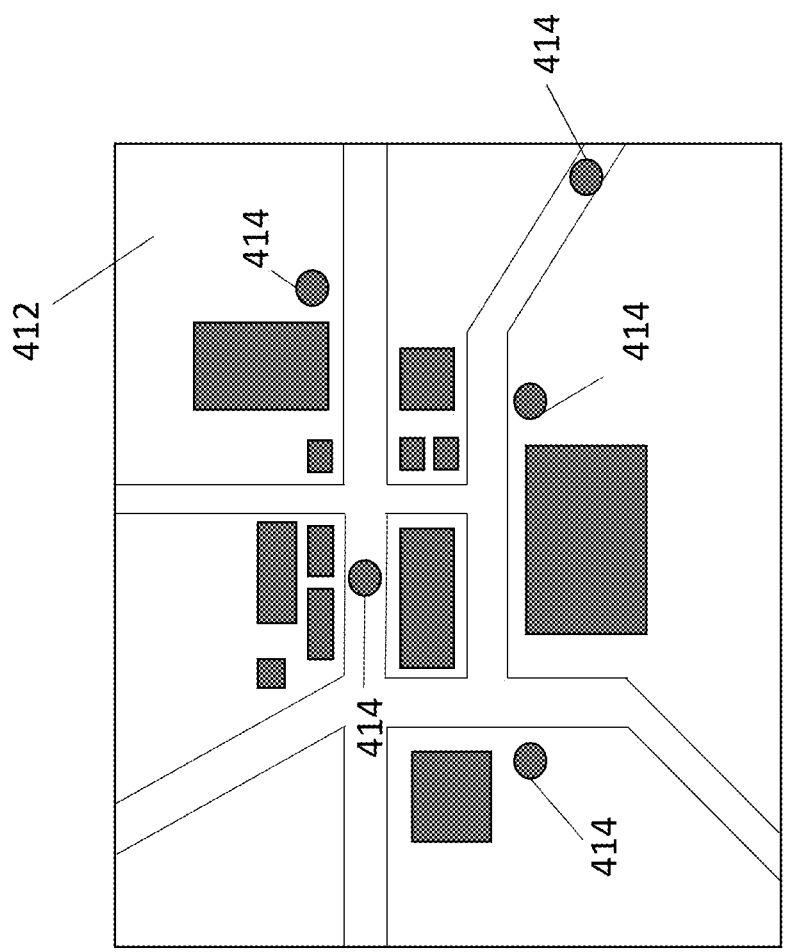
FIG. 10 is an exemplary map of returned matches.

In still other exemplary embodiments, the aforementioned list of worker users 404 and/or list of job entries 454 may be presented in the form of a map 412 as shown at FIG. 10. The map 412 may be a rendering of the area in proximity to the hiring user's service site or the worker user's current location, respectively. The map 412 may comprise rendering of streets, landmarks, buildings, rivers, and the like. A number of markers 414 may be provided on the map 412. For hiring users using the app, the markers 414 may indicate nearby matching worker users. Each marker 414 may be selected by the hiring user to bring up more information about the given worker user and/or to hire the worker user to perform the job in question. For worker users using the app, the markers 414 may indicate nearby jobs. Each marker 414 may be selected by the worker user to bring up more information about the given job entry and/or to accept the job. The markers 414 may be of any size, shape, color, or the like. The markers 414, in exemplary embodiments, may flash, pop-up, or the like. For example, without limitation, when searching for certified forklift operators, each marker 414 may represent a certified forklift operator available for temporary work and in close proximity to the hiring user.

Figure 11:
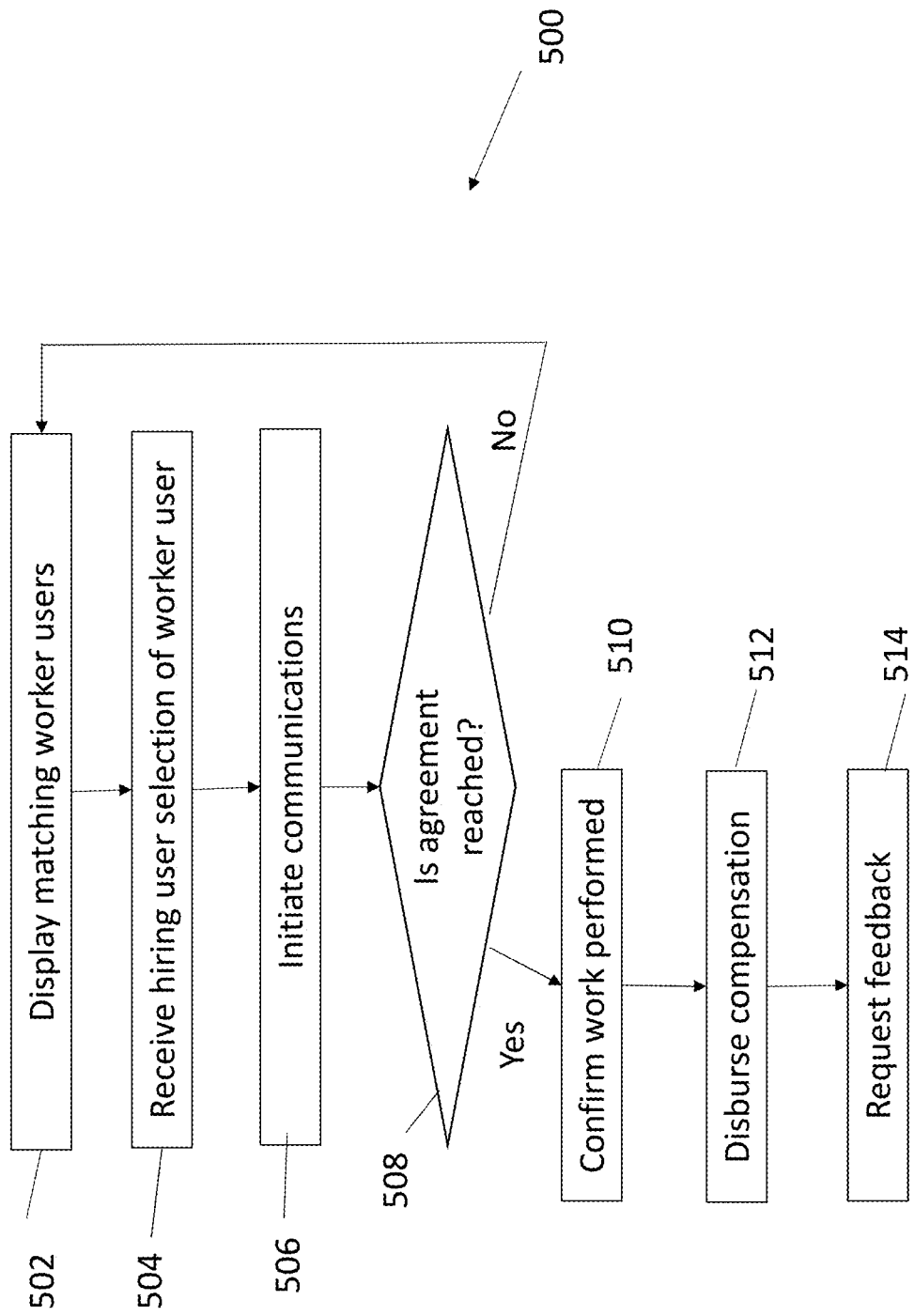
FIG. 11 is a flow chart of exemplary logic for hiring a worker user.

FIG. 11 is a flow chart of exemplary logic for a hiring user to hire a worker user 500. At step 502, a number of potentially matching worker users may be displayed. The matches may be displayed in a list, for example without limitation, similar to the list 400 of FIG. 9A. In other exemplary embodiments, without limitation, the matches may be displayed on a map 412 similar to FIG. 10. Regardless, at step 504 a hiring user's selection of a given worker user may be received and the worker user may be notified of his or her selection. At step 506 communications between the hiring user and the worker user may be initiated. Such communications may be accomplished by way of a chat feature. In other exemplary embodiments, the worker user's or the hiring user's contact information may be displayed. In still other exemplary embodiments, the hiring user or the worker user may be contacted through the app confidentially such that the respective user's contact information is not revealed to the other party, but such that the respective user's phone, VOIP, text messaging, SMS messaging, chat messaging, social media, or the like messaging may be utilized to perform the communications. These communications may be used to provide further details regarding the job including for example without limitation, compensation rate, time requirements, effort requirements, skills needed, training, licensing, or certification needed, tools needed, tools provided, and the like.

At step 508, if an offer is made and accepted an agreement is reached. If no agreement is reached, the hiring user may return to the list of matching worker users. Assuming an agreement is reached, the worker user may show up and perform the work. The hiring user may, at step 510, confirm that the work was performed. Alternatively, or in addition, such confirmation may be documented by way of photo(s), video(s), or the like of the services performed. Such confirmation may, alternatively or in addition, by confirmed by tracking the worker user's duration of stay at the job site. At step 512, compensation may be calculated based upon the agreed to terms and disbursed, preferably by way of the payment module 18. At step 514, the app may request that the hiring user provide feedback for the worker user. Alternatively, or in addition, the app may request that the worker user provide feedback regarding the hiring user. Such feedback may be, for example without limitation, a written review, a rating (e.g., 1-5 stars, etc.), some combination thereof, or the like. In exemplary embodiments, the worker user may provide a rating for the hiring user. The feedback may, for example, be an overall impression or may be broken down into categories, such as but not limited to, ease of working with, accuracy of work description, manner, and the like. Any criteria for feedback is contemplated. This feedback information may become part of the worker user or the hiring user's profile such that it is available to other app users to consider when selecting a job or a worker.

Alternative or in addition, once the hiring user selection of a worker user is received at step 504, the app may provide the worker user with directions to visit the job site and evaluate the service to be provided. This may advantageously permit the worker user and/or the hiring user to reevaluate and reconsider the job such as, but not limited to, the services needed, the tools needed, the level of services desired, the compensation rate, the time required, and the like. The job may be declined based upon the worker user's visit. Otherwise, the job may be re-negotiated as required and finalized in the app. The app may be configured to present the worker user with an option to indicate that a given job entry was misleading or incorrect. The app may be configured to remove a hiring user with misleading or incorrect job entries above a predetermined threshold.

Figure 12:
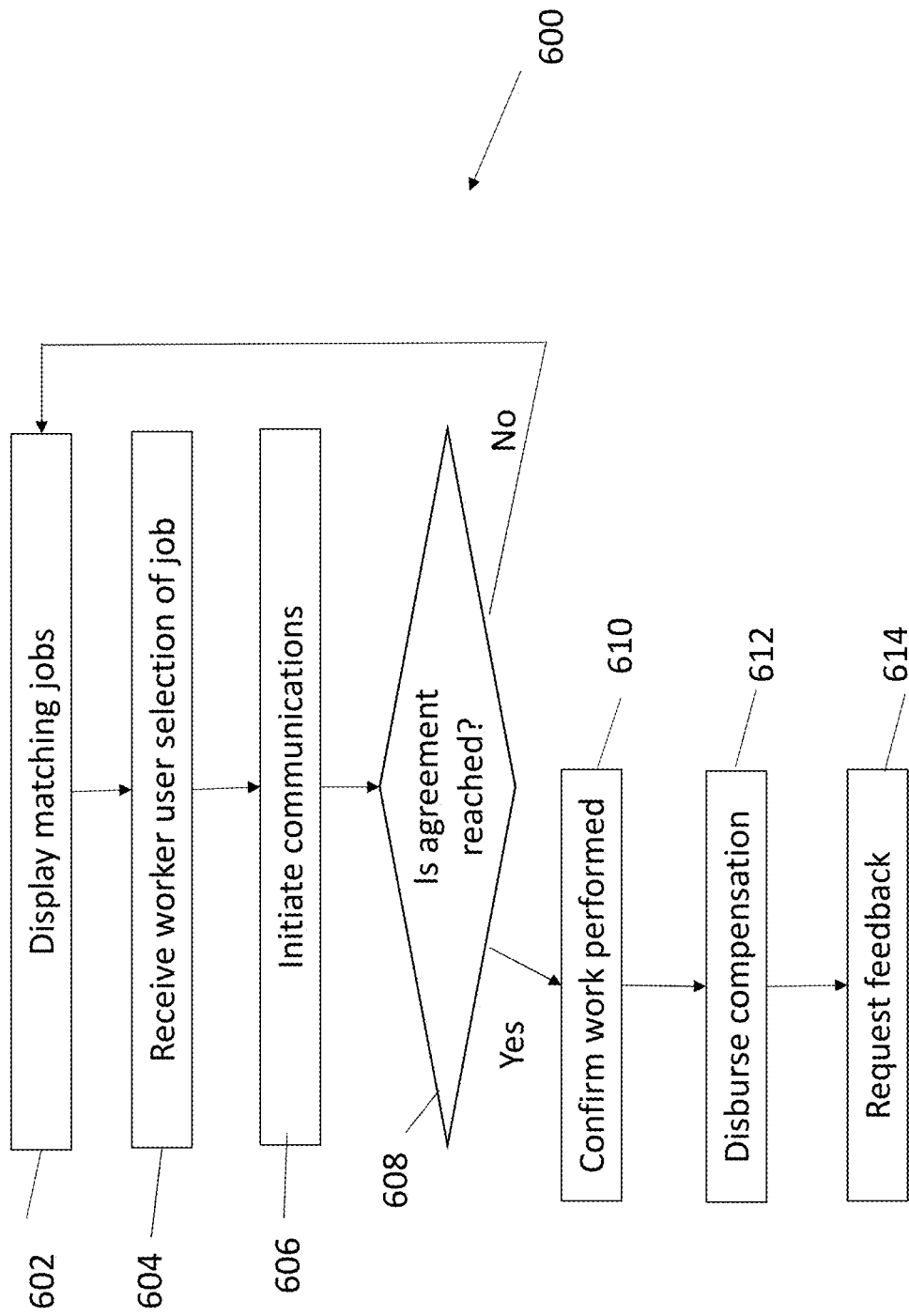
FIG. 12 is a flow chart of exemplary logic for selecting a job.

FIG. 12 is a flow chart of other exemplary logic for hiring a worker user 600. At step 602, a number of potentially matching jobs may be displayed. The matching jobs may be displayed in a list, for example without limitation, similar to the list 450 of FIG. 9B. In other exemplary embodiments, without limitation, the matches may be displayed on a map 412 similar to FIG. 10. At step 604, a user selection of a job may be received and the hiring worker may be notified of the selection. At step 606, communications between the hiring user and the worker user may be initiated. Such communications may be accomplished by way of a chat feature. In other exemplary embodiments, the worker user's or the hiring user's contact information may be displayed. In still other exemplary embodiments, the hiring user or the worker user may be contacted through the app confidentiality such that the respective user's contact information is not revealed to the other party, but such that the respective user's phone, VOIP, text messaging, SMS messaging, chat messaging, social media, or the like messaging may be utilized to perform the communications. These communications may be used to provide further details regarding the job including for example without limitation, compensation rate, time requirements, effort requirements, skills needed, training, licensing, or certification needed, tools needed, tools provided, and the like.

At step 608, if an offer is made and accepted, an agreement is reached. If no agreement is reached, the hiring user may return to the list of matching worker users. Assuming an agreement is reached, the worker user may show up and perform the work. The hiring user may, at step 610, confirm that the work was performed. At step 612, compensation may be calculated based upon the agreed to terms and disbursed, preferably by way of the payment module 18. At step 614, the app may request that the hiring user provide feedback for the worker user. Alternatively, or in addition, the app may request that the worker user provide feedback regarding the hiring user. Such feedback may be, for example without limitation, a written review, a rating (e.g., 1-5 stars, etc.), some combination thereof, or the like. In exemplary embodiments, the worker user may provide a rating for the hiring user. The feedback may, for example, be an overall impression or may be broken down into categories, such as but not limited to, ease of working with, accuracy of work description, manner, and the like. Any criteria for feedback is contemplated. This feedback information may become part of the worker user or the hiring user's profile such that it is available to other app users to consider when selecting a job or a worker.

Alternative or in addition, once the worker selection of a job is received at step 604, the app may provide the worker user with directions to visit the job site and evaluate the service to be provided. This may advantageously permit the worker user and/or the hiring user to reevaluate and reconsider the job such as, but not limited to, the services needed, the tools needed, the level of services desired, the compensation rate, the time required, and the like. The job may be re-negotiated as required and finalized in the app. The app may be configured to present the worker user with an option to indicate that a given job entry was misleading or incorrect. The app may be configured to remove a hiring user with misleading or incorrect job entries above a predetermined threshold.

Figure 13:
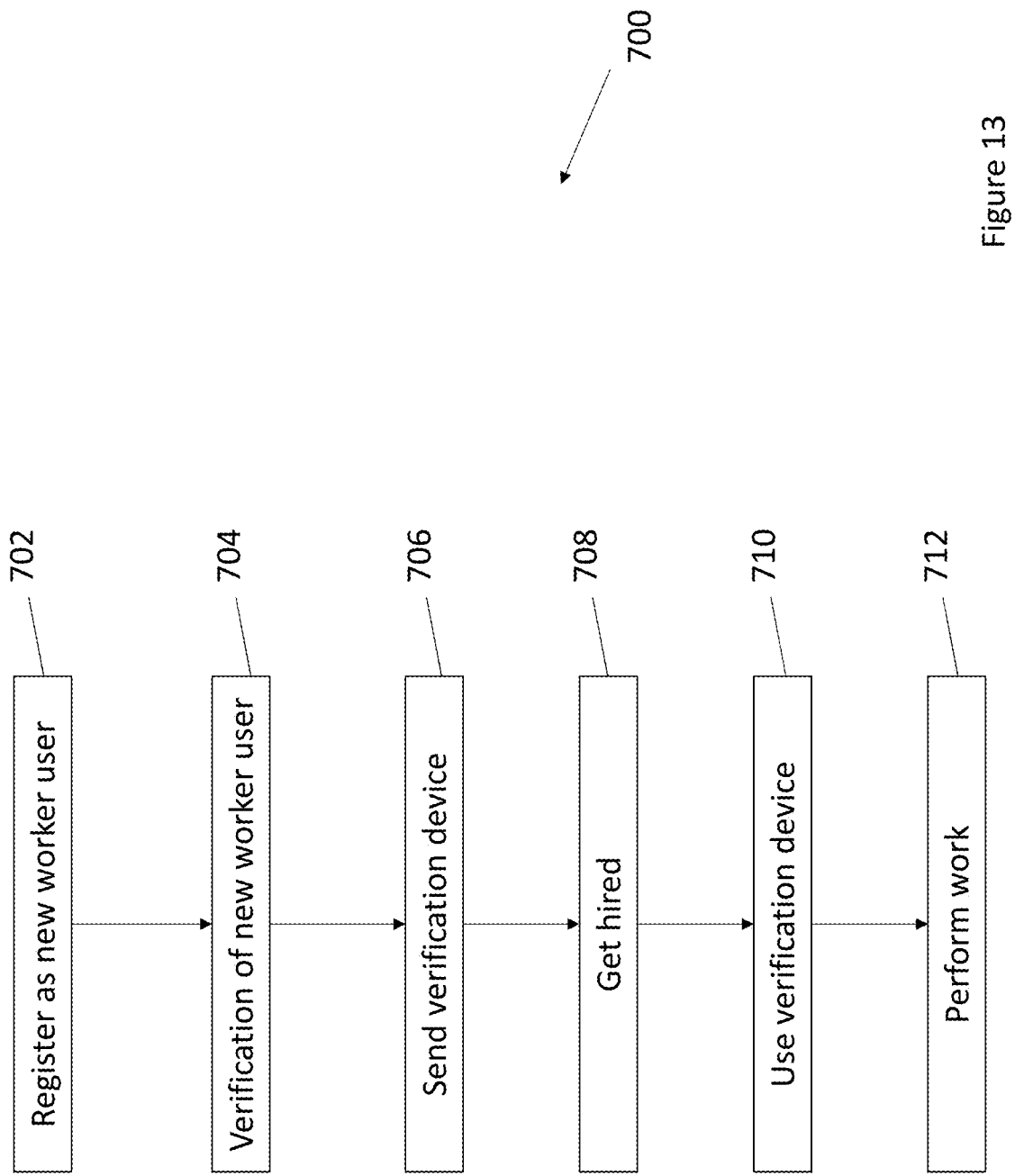
FIG. 13 is a flow chart of exemplary logic for worker verification.

FIG. 13 is a flow chart of exemplary logic for worker verification 700. A new worker user may be registered at step 702. Such registration may be made, for example without limitation, as discussed with respect to step 102 of FIG. 2. The worker user's information may be verified at step 704. Such verification, for example without limitation, may be made to the information provided at step 102A-C of FIG. 2, and may be independently verified by a third party, by information on the fob 22, and/or the new worker user may be requested to provide corroborating documentation, which may be stored on the server 12 or the fob 22. Verification, including but not limited to independent verification or request for corroborating documentation, is contemplated for any information.

Regardless, once the new user worker's information is verified, the new worker user may be sent a verification device 20 at step 706. As will be explained in further detail herein, the verification device 20 may be a separate tangible item or may be an electronic item, such as but not limited to, a code or password. The verification device 20 may be stored on the fob 22 and may be linked to a verification certificate, images of corroborating documentation, or the like. After the worker user receives a hire notification and an agreement may be reached at step 708. The worker user may show up and use the verification device at step 710 to verify that he or she is the hired worker. Once verified, the worker user may perform the services at step 712. Performance may, in exemplary embodiments without limitation, be subsequently confirmed, payment may be disbursed, and reviews may be requested.

Figure 14:
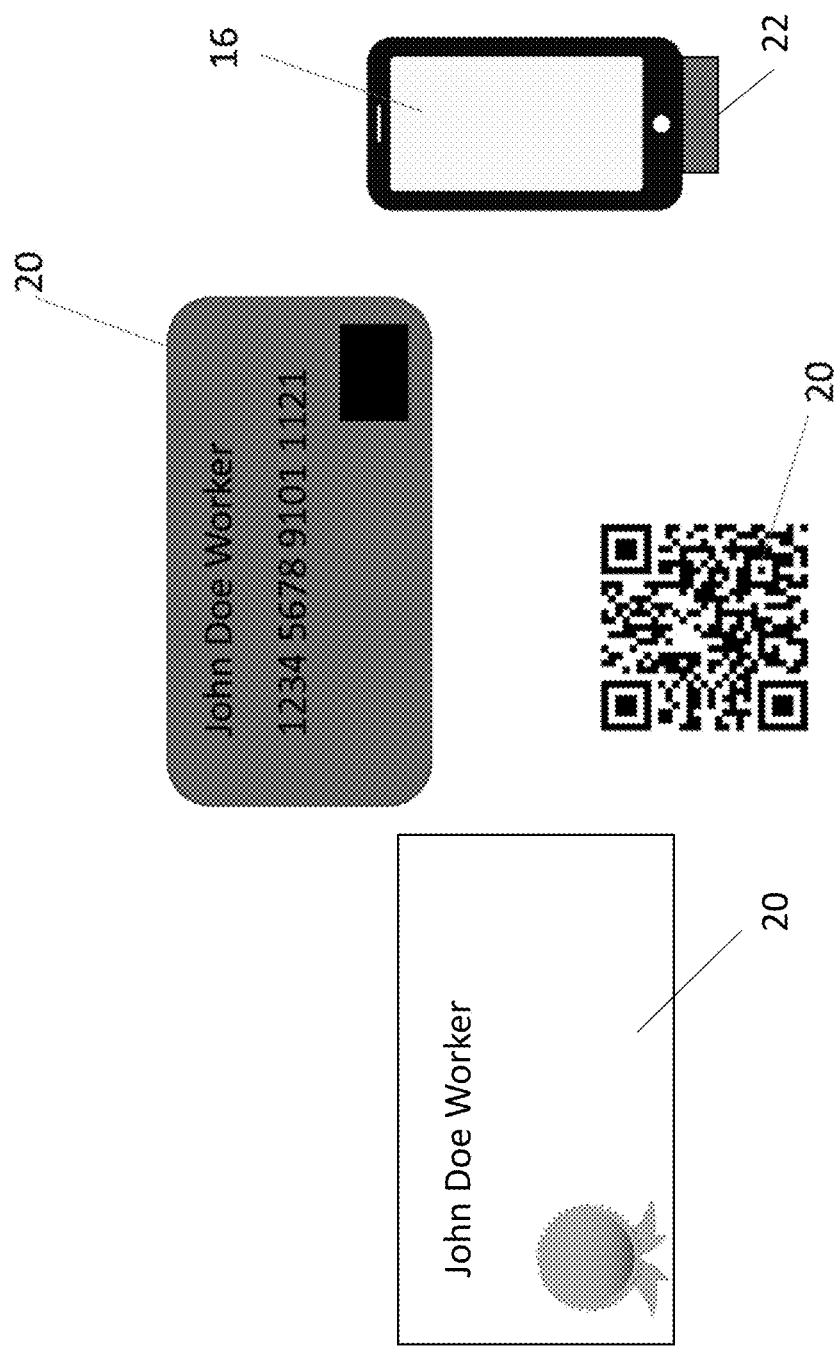
FIG. 14 is an exemplary verification system.

FIG. 14 is an exemplary verification system for use with the system 10 and the verification logic 700 of FIG. 13. The verification device 20 may be an ID card, a chip, RFID, QR code, bar code, other code, passphrase, or the like. The verification device 20 may be read, scanned, processed, viewed, or otherwise used by the hiring user. In exemplary embodiments, the verification device is read, scanned, processed, viewed, or otherwise used by way of the user device 16. In exemplary embodiments, without limitation, the verification device 20 is a unique code which can be read or utilized by the hiring user (for example, without limitation, by way of the user device 16) to verify that the person who appears to perform the work is the worker user the hiring user hired via the app. The verification device 20 may also serve to match the worker user and the hiring user to the job transaction stored by the app. Additionally, or alternatively, the verification device 20 gives the hiring user assurances that the worker user possesses the skills, experience, or the like described by the worker user on the app.

The verification device 20 may be a physical device sent to the worker user. For example, without limitation, the verification device 20 may be a card with a chip or a magnetic strip. In such exemplary embodiments, the chip, magnetic strip, or other portion of the card may be read by a card reader. The card reader may be the user device 16, a component attached thereto, or a separate device. As another example, again without limitation, the verification device 20 may be an electronic code, such as but not limited to a QR code. In such exemplary embodiments, the electronic code may be read by the user device 16, a component attached thereto, or a separate device. The verification device 20 may be located at the fob 22, though such is not required. As a further example, again without limitation, the verification device 20 may be an ID card, certificate, or badge that is presented to the hiring user.

Figure 15:
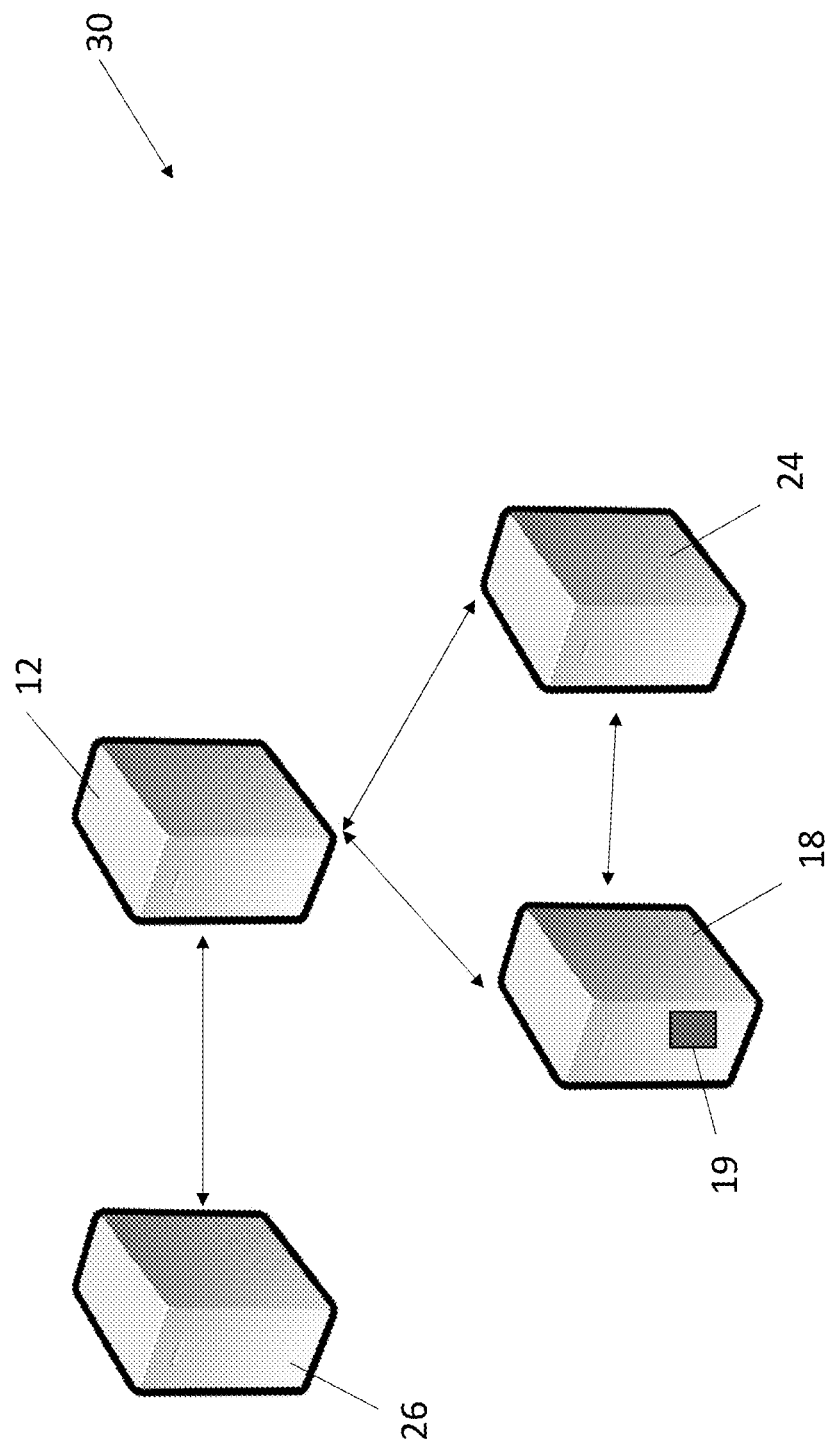
FIG. 15 is a plan view of an exemplary payment and pricing system.

FIG. 15 is a plan view of another exemplary payment and pricing system 30. The payment system 30 may be an extension of the system 10 shown and described with respect to FIG. 1, though such is not required. The server 12 may be in electronic communication with a pricing module 26. In exemplary embodiments the server 12, by way of the pricing module 26, may be configured to determine one or more pricing options. For example, without limitation, the pricing module 26 may comprise data representing customary pricing for each of the predefined service tasks 204. This customary pricing may be geographic specific. The app may be configured to set the compensation rate for a given job by way of the customary pricing.

Alternatively, or in addition, the pricing module 26 may place the hiring user for a given job in electronic communication with multiple worker users by way of a chat or other communication tool. This may permit the hiring user to bid the job out to multiple worker users. The pricing module 26 may be configured to automatically submit a request for quote to multiple matching worker users. The worker users may be given an amount of time to respond. The pricing module 26 may be configured to automatically select the highest bid at the close of the bidding window. In other exemplary embodiments, the hiring user may be presented with all bids and permitted to pick the worker user to hire.

The server 12 may be in electronic communication with the payment submodule 18 as well as a payment database 24. The payment database 24 may comprise payment information, such as but not limited to, the payment information collected with respect to step 1028 of FIG. 2 and 302D of FIG. 8, though such is not required. Such payment information may include, but is not limited to, credit card information, debit card information, bank account information, gift card balances, account balances, tip information, some combination thereof, or the like.

Figure 16:
FIG. 16 is a flow chart of exemplary logic for the payment system of FIG. 15.

FIG. 16 is a flow chart of exemplary logic, as generally indicated at item 800, for the payment system of FIG. 15. Once the work is performed and confirmed as completed, the compensation may be calculated for disbursement as shown and described in steps 510, 512, and 514 of FIG. 11 and 610, 612, and 614 of FIG. 12 for example without limitation. As part of the calculation the user may be charged the agreed service fee at step 802. A facilitator fee may be subtracted at step 804. The facilitator fee may be a percentage of the agreed service fee or a flat rate. At step 806, the app may be configured to prompt the hiring user to tip the worker user. In exemplary embodiments, the prompt may include one or more suggested tip amounts, such as but not limited to, no tip, 15%, 20%, 25%, a custom amount, $1, $3, $5, $10, some combination thereof, or the like. At step 808 the balance may be paid to the worker user. The balance paid may be the agreed service fee, minus the facilitator fee, plus the tip. The facilitator fee may be separately provided to the app facilitator or other third party. Such payment may occur automatically once the tip amount is indicated at step 806, though such is not required.

In exemplary embodiments, the payment database 24 may comprise the transactional information required to initiate and complete the necessary transactions. The payment database 24 may further serve a bookkeeping role and keep a record of total amounts paid to various worker users, by various hiring users, and to the app administrator in terms of facilitation fees. The payment module 18 may complete the transactions by charging or debiting the appropriate accounts and crediting or depositing the other appropriate accounts. Such transactions may be performed by a payment processor 19. The payment module 18 may also issue receipts which are stored at the payment database 24.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices described herein may be general purpose or specialized devices. The electronic devices may be personal computers, smartphone, tablets, databases, servers, or the like. The electronic connections described herein may be accomplished by wired or wireless means.

What is claimed is:

1. A system for hiring and authenticating persons to perform services on a temporary basis, said system comprising:
   one or more servers configured to host an application and be placed in electronic communication with a number of electronic devices by way of a network, wherein at least one of the number of electronic devices is associated with hiring users ("the hiring user devices") and at least one other of the number of electronic devices is associated with worker users ("the worker user devices");
   one or more processors associated with the one or more servers;
   a payment module in electronic connection with the one or more servers;
   a number of verification devices, each associated with a given one of the worker users and comprising a tangible object that is selectively connectable to the worker user devices and the hiring user devices comprising electronically stored verification information configured to be recognized by the application, wherein said verification information comprises an electronic code wirelessly readable by the hiring user devices in an automated fashion;

one or more electronic storage devices, each associated with the one or more servers and comprising executable software instructions, which when executed by the one or more processors, configure the one or more servers to:

register the worker users based on worker user information received at respective ones of the worker user devices;

electronically load the verification information for each of the worker users registered onto one of the verification devices for an associated one of the worker users based upon the worker user information received during registration;

register the hiring users based on hiring user information received at respective ones of the hiring user devices;

generate first prompts requesting the hiring users to enter desired services for a given job entry, wherein said desired services are selected from a predetermined list of potential desired services descriptions;

generate second prompts with predetermined lists of tools likely required for each of the desired services of each of the job entries and requesting the hiring user to select one or more tools from the list of tools likely required, and for each respective one of the one or more tools selected, provide prompts for indicating and selecting whether the respective one of the one or more tools selected will be provided by the hiring user or provided by the worker user;

create the job entries based upon information gathered in response to the first and second prompts;

following connection of a given one of the verification devices to the given one of the worker user devices, automatically generate a visual display at the given one of the worker user devices of certain ones of the job entries matching the worker user information for the given one of the worker users and signal availability of the given one of the worker users;

generate, on demand and at a given one of the hiring user devices, a list of at least certain ones of the worker users signaled as available for hire;

receive indication of mutual acceptance by the given one of the worker users and the given one of the hiring users of at least one of the matching ones of the job entries;

generate a verification prompt at the given one of the hiring user devices associated with the accepted matching one of the job entries for wireless receipt of the verification information, including the electronic code, for the given one of the verification devices;

generate a wirelessly transmissible data packet comprising the verification information, including the electronic code, at the given one of the worker user devices;

electronically extracting the electronic code from the data packet wirelessly received at the given one of the hiring user devices;

confirm, by way of the application, that verification information, including the electronic code, received at the given one of the hiring user devices matches verification information stored at the one or more servers for the given one of the worker users;

generate a prompt at the given one of the hiring user devices requesting confirmation that the desired services were performed;

generate a prompt requesting a given one of the hiring users associated with the given one of the hiring user devices to enter a tip amount;

calculate compensation for the given one of the worker users; and disburse compensation to the given one of the worker users by way of the payment module; and a pricing submodule comprising a database of customary pricing for each of the predetermined list of potential services, wherein the compensation is calculated by taking the customary pricing for the service the worker user is hired to complete, subtracting a predetermined facilitator fee, and adding the tip amount selected by the hiring user.

2. The system of claim 1 wherein:

said worker user information comprises an electronic worker user photo and data regarding skills, training, experience, licensing, and certification information, payment information, and tools information;

said hiring user information comprises data regarding company or individual information, payment information, and an electronic hiring user photo;

each of said job entries comprise data regarding one or more services desired, geographic job site information, compensation information, tools required or provided information, and service level information;

the matching job entries are determined by retrieving only the certain ones of the job entries whose job information includes services desired which match the worker user's skills;

the matching job entries are further determined by including only the job entries in the visual display for the given worker user those job entries indicating tools to be provided by the worker user which the given worker user has indicated having; and the matching job entries are further determined by including only the job entries in the visual display for the given worker user those job entries indicating training, experience, licensing, and certification information matching that of the service level information for the given worker user.

3. The system of claim 2 wherein:

the visual display comprises a list, wherein each of said certain of said job entries on said list comprises a title, a compensation rate, and an accept prompt.

4. The system of claim 2 wherein:

the visual display comprises a map of an area proximate the given worker user's current location; and each of the matching job entries is displayed on the map at a location visually corresponding to the geographic job site information for the given one of the matching job entries.

5. The system of claim 2 further comprising:

additional software instructions stored at the one or more electronic storage devices, which when executed, configure the one or more processors to generate a prompt requesting the hiring user to enter the compensation information, wherein said compensation information is entered by indicating the number of service hours desired and a compensation rate or a flat rate to complete the desired service.

6. The system of claim 2 further comprising:

each of said verification devices comprise an electronic fob with an embedded microchip, wherein each of said electronic fobs are configured to be electronically connected to a respective one of the worker user devices by way of physical connection and transmit at least the electronic code within the embedded microchip to a respective one of the hiring user devices by wireless near field connection with the respective one of the hiring user devices, and wherein each of said electronic fobs comprises data, electronically stored, regarding skills, training, experience, licensing, and certification information for a respective one of the worker users.

7. The system of claim 6 wherein:
each of said electronic fobs comprise images, electronically stored, of corroborating documentation for the skills, training, experience, licensing, and certification information for the respective one of the worker users.

8. The system of claim 6 wherein:
additional software instructions, stored at the one or more electronic storage devices, which when executed, configure the one or more processors to automatically generate the visual display of the matching job entries at a respective one of the worker user devices upon electronic connection of a respective one of the electronic fobs to a respective one of the worker user devices.

9. The system of claim 1 further comprising:
additional software instructions stored at the one or more electronic storage devices, which when executed, configure the one or more processors to provide a direct messaging interaction between the given one of the worker user devices associated with the given one of the worker users and the given one hiring user devices.

10. The system of claim 9 further comprising:
a pricing submodule configured to automatically issue a bid request to each matched one of the worker users and receive bids from each of said matched worker users and automatically select the lowest bid.

11. The system of claim 1 further comprising:
additional software instructions, stored at the one or more electronic storage devices, which when executed, configure the one or more processors to generate a prompt requesting a review of the given one of the worker users upon conformation that the desired services were performed.

12. The system of claim 1 further comprising:
additional software instructions stored at the one or more electronic storage devices, which when executed, configure the one or more processors to electronically load the verification information for each of the hiring users registered onto one of the verification devices for an associated one of the hiring users based upon the hiring user information received during registration.

13. The system of claim 12 further comprising:
additional software instructions stored at the one or more electronic storage devices, which when executed, configure the one or more processors to:
receive a hiring user selection of one of the at least certain ones of the worker users signaled as available for hire; and
transmit a solicitation message to the one of the at least certain ones of the worker users selected by the given one of the hiring users.

14. The system of claim 12 further comprising:
additional software instructions stored at the one or more electronic storage devices, which when executed, configure the one or more processors to:
generate a verification prompt at the given one of the worker user devices associated with the accepted one of the job entries for receipt of the verification information, including the electronic code, for a given one of the verification devices associated with the given one of the hiring users; and
confirm, by way of the application, that verification information, including the electronic code, received at the given one of the worker user devices matches stored verification information stored at the one or more servers for the given one of the hiring users.

15. The system of claim 1 wherein:
said wirelessly transmissible data packet is embedded within a QR code.

16. The system of claim 1 wherein:
said wirelessly transmissible data packet is configured for transmission by near field communication.

17. A system for hiring and authenticating persons to perform services on a temporary basis, said system comprising:
a number of servers configured to host an application and be placed in electronic communication with a number of electronic devices by way of a network, wherein at least one of the number of electronic devices is associated with hiring users ("the hiring user devices") and at least one other of the number of electronic devices is associated with worker users ("the worker user devices");
a number of processors associated with the number of servers;
a payment module in electronic connection with the number of servers;
a number of electronic fobs, each associated with one of with the worker users, separable from, and configured for selective electronic connection with, the worker user devices associated with the one of the worker users, and electronically storing verification information, comprising an electronic code which is optically readable by the hiring user devices, specific to the one of the worker users configured to be recognized by the application in association with the one of the worker users when presented electronically to one of the hiring user devices;
a number of electronic storage devices located at the number of servers and comprising executable software instructions, which when executed by the number of processors, configure the number of servers to:
register the worker users based on worker user information received at respective ones of the worker user devices;
electronically load the electronic fobs with the verification information for the worker users;
register the hiring users based on hiring user information received at respective ones of the hiring user devices;
generate a first prompt at the hiring user devices requesting selection by the hiring users of one or more desired services from a predetermined list of potentially desirable services, wherein said selection is accomplished by way of an auto-populated field;
generate a second prompt at the hiring user devices requesting a hiring user indication of where the services are to be performed, wherein options for said service location comprise the hiring user's current location or another address;
generate a third prompt at the hiring user devices requesting selection by the hiring users of compensation rate for the desired services, wherein said options for said compensation rate comprise a desired number of hours and an hourly rate or a flat rate;

generate a fourth prompt at the hiring user devices providing a predetermined list of tools required, wherein said predetermined list of tools are determined based upon selection by the hiring users of the desired services, and wherein the fourth prompt requests selection by the hiring users of tools required as well providing prompts for indicating and selecting, individually, whether each of the selected tools is to be provided by the hiring users or by the worker user;

generate a fifth prompt at the hiring user devices requesting selection by the hiring users of a desired service level, wherein said desired service level comprises selection by the hiring users of desired experience level, desired certification level, and desired licensing level;

create a number of job entries based upon the information gathered in response to the first, second, third, fourth, and fifth prompts;

following connection of a given one of the electronic fobs to the one of the worker user devices, automatically generate a map of job entries matching the worker user's worker user information and within a predetermined distance of a current location for the given one of the worker users for display on the given one of the worker user devices associated with the given one of the worker users and signal availability of the given one of the worker users;

generate, on demand and at a given one of the hiring user devices, a list of at least certain ones of the worker users signaled as available for hire;

receive indication of mutual acceptance by the given one of the worker users and the given one of the hiring user of at least one of the matching job entries;

generate a verification prompt at the given one of the hiring user devices associated with the accepted matching job entry for receipt of the verification information, comprising said electronic code, of the given one of the verification devices;

optically generate, at the given one of the worker devices, a QR code for electronic scanning at the given one of the hiring user devices;

electronically extract the electronic code from data obtained by the given one of the hiring user devices from optical scanning of the QR code presented at the given one of the worker devices;

confirm, by way of the application, that the verification information received, including the electronic code, matches verification information stored at the one or more servers for the given one of the worker users;

confirm that the desired services were performed at the given one of the hiring user devices;

calculate compensation for each of the given one of the worker users;

disburse compensation to each of the given one of the worker users by way of the payment module;

generate a sixth prompt at the given one of the hiring user devices requesting a hiring user review of the given one of the worker users; and automatically update an experience level for the given worker user upon confirmation that the job was completed.

18. A system for hiring and authenticating persons to perform services on a temporary basis, said system comprising:

one or more servers configured to host an application and be placed in electronic communication with a number of electronic devices by way of a network, wherein at least one of the number of electronic devices is associated with hiring users ("the hiring user devices") and at least one other of the number of electronic devices is associated with worker users ("the worker user devices");

one or more processors associated with the one or more servers;

a payment module in electronic connection with the one or more servers;

a number of verification devices, each associated with a given one of the worker users and comprising a tangible object that is selectively connectable to the worker user devices and the hiring user devices comprising electronically stored verification information configured to be recognized by the application, wherein said verification information comprises an electronic code wirelessly readable by the hiring user devices in an automated fashion;

one or more electronic storage devices, each associated with the one or more servers and comprising executable software instructions, which when executed by the one or more processors, configure the one or more servers to:

register the worker users based on worker user information received at respective ones of the worker user devices;

electronically load the verification information for each of the worker users registered onto one of the verification devices for an associated one of the worker users based upon the worker user information received during registration;

register the hiring users based on hiring user information received at respective ones of the hiring user devices;

generate first prompts requesting the hiring users to enter desired services for a given job entry, wherein said desired services are selected from a predetermined list of potential desired services descriptions;

generate second prompts with predetermined lists of tools likely required for each of the desired services of each of the job entries and requesting the hiring user to select one or more tools from the list of tools likely required, and for each respective one of the one or more tools selected, provide prompts for indicating and selecting whether the respective one of the one or more tools selected will be provided by the hiring user or provided by the worker user;

create the job entries based upon information gathered in response to the first and second prompts;

following connection of a given one of the verification devices to the given one of the worker user devices, automatically generate a visual display at the given one of the worker user devices of certain ones of the job entries matching the worker user information for the given one of the worker users and signal availability of the given one of the worker users;

generate, on demand and at a given one of the hiring user devices, a list of at least certain ones of the worker users signaled as available for hire;

provide a direct messaging interaction between the given one of the worker user devices associated with the given one of the worker users and the given one hiring user devices;

receive indication of mutual acceptance by the given one of the worker users and the given one of the hiring users of at least one of the matching ones of the job entries;

generate a verification prompt at the given one of the hiring user devices associated with the accepted matching one of the job entries for wireless receipt of the verification information, including the electronic code, for the given one of the verification devices;

generate a wirelessly transmissible data packet comprising the verification information, including the electronic code, at the given one of the worker user devices;

electronically extracting the electronic code from the data packet wirelessly received at the given one of the hiring user devices;

confirm, by way of the application, that verification information, including the electronic code, received at the given one of the hiring user devices matches verification information stored at the one or more servers for the given one of the worker users;

generate a prompt at the given one of the hiring user devices requesting confirmation that the desired services were performed;

calculate compensation for the given one of the worker users; and disburse compensation to the given one of the worker users by way of the payment module; and a pricing submodule configured to automatically issue a bid request to each matched one of the worker users and receive bids from each of said matched worker users and automatically select the lowest bid.

* * * * *

UNITED STATES PATENT AND TRADEMARK OFFICE
CERTIFICATE OF CORRECTION

PATENT NO. : 11,797,937 B2  
APPLICATION NO. : 16/286142  
DATED : October 24, 2023  
INVENTOR(S) : Mark Lamoncha Page 1 of 1

It is certified that error appears in the above-identified patent and that said Letters Patent is hereby corrected as shown below:

In the Specification

In Column 2, Line 20, please delete "by" and insert -- be --.
In Column 5, Line 17, please delete "1028" and insert -- 102B --.
In Column 5, Line 48, please delete "1048" and insert -- 104B --.
In Column 6, Line 5, please delete "it" and insert -- is --.

Signed and Sealed this  
Twenty-third Day of January, 2024

Katherine Kelly Vidal  
*Director of the United States Patent and Trademark Office*